(12) United States Patent
Yamashita et al.

(10) Patent No.: US 6,365,097 B1
(45) Date of Patent: Apr. 2, 2002

(54) SOLDER ALLOY

(75) Inventors: Mitsuo Yamashita; Shinji Tada; Kunio Shiokawa, all of Kawasaki (JP)

(73) Assignee: Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 09/492,219

(22) Filed: Jan. 27, 2000

(30) Foreign Application Priority Data

Jan. 29, 1999 (JP) .......................................... 11-022403

(51) Int. Cl.$^7$ .............................................. C22C 13/02
(52) U.S. Cl. ........................................ 420/561; 420/562
(58) Field of Search ................................ 420/561, 562

(56) References Cited

U.S. PATENT DOCUMENTS

5,863,493 A * 1/1999 Achari et al. ................ 420/557
5,980,822 A * 11/1999 Moon et al. ................. 420/561

FOREIGN PATENT DOCUMENTS

DE       19752215 A1  *  9/1998
JP       8-206874         8/1996
JP       10-034376        2/1998
JP       10-230384        9/1998

OTHER PUBLICATIONS

"Microstructural Features of Lift–Off Phenomenon in Through–Hole Circuit Soldered by Sn–Bi Alloy" Suganuma *Scripta Materialia*, vol. 38, No. 9, Apr. 3, 1998, pp. 1333–1340.
Binary Alloy Phase Diagrams Volumne 1, Massalaki et al, ed. 1986 p. 540.*

* cited by examiner

*Primary Examiner*—Roy King
*Assistant Examiner*—Tima McGuthry-Banks
(74) *Attorney, Agent, or Firm*—Venable; Robert J. Frank; Keith G. Haddaway

(57) ABSTRACT

A novel lead-free Sn—Bi based alloy having an improved wettability in comparison to conventional Sn—Bi based alloys, a melting point lower than 221° C., the eutectic point of an Sn—Ag alloy, and proper bonding and heat-resistant properties is provided. This alloy is an Sn—Bi based alloy containing tin as a major component, and 21 wt.% or less bismuth, 4 wt.% or less silver, 2 wt.% or less copper (inclusive of zero), and 0.2 wt.% or less nickel.

8 Claims, 1 Drawing Sheet

SOLDER ALLOY

This application is based on Patent application No. 11-22403 filed on Jan. 29, 1999 in Japan, the content of which is incorporated herein to by reference.

BACKGROUND OF THE INVENTION

1. Field of the Invention

The present invention primarily relates to a solder alloy mainly used in metal bonding of an electric device. In particular, the present invention relates to a lead free, eco-friendly solder alloy that does not cause pollution.

2. Description of Related Art

In an electric device, when solder bonding is performed, a solder alloy is required to have a desired bonding temperature, proper wettability during bonding, and superior thermal fatigue strength, ductility, and heat resistance. In addition, such a solder alloy is desired to be free of lead in consideration of environment conservation.

Conventional solder alloys include Sn—Pb, Sn—Ag, Sn—Sb, and Sn—Bi alloys.

A typical Sn—Pb alloy, 63Sn-37Pb (which means 63 wt.% Sn- 37 wt.% Pb, and has an eutectic point of 183° C.) contains lead. Thus, such Sn—Pb alloy may cause lead pollution, and is not eco-friendly. Lead-free solder alloys which may be substituted for 63Sn-37Pb include an Sn—Ag alloy (Sn-3.5 Ag, eutectic point of 221° C.) and an Sn—Sb alloy (Sn-9 Sb and peritectic temperature of 246° C.). These alloys have higher melting points than the 63Sn-37Pb eutectic solder, and have a problem with heat resistance during bonding for some electronic parts. Thus, a solder alloy having a melting point lower than these melting points is desired. A method for lowering a melting point includes an addition of Bi or In to Sn. A 42Sn-58Bi alloy has an eutectic point of 139° C., and a 52Sn-48In alloy has a eutectic point of 117° C.

As a lead-free alloy with a low melting point, a Sn—Bi based alloy having a composition of Sn-7.5 Bi-2.0 Ag-0.5 Cu has been disclosed in Japanese Patent Application Laid-Open No. 8-206874 and Scripta Materialia, Vol. 38, No. 9, pp. 1333–1340, 1998. However, lead-free Sn-based alloys have poorer wettability and bonding properties than Sn—Pb alloys, since Sn is prone to oxidation. Further, Bi and In that are additive elements for lowering the melting point of lead-free Sn-based solder alloys are more prone to be oxidized than Sn. Thus, there has been a problem that the above mentioned Sn—Bi based alloys and Sn—In alloys have unstable solderability. In addition, when Bi is added, it tends to become hard and brittle. Thus, there has been another problem that the above mentioned alloys have lower thermal fatigue strength.

SUMMARY OF THE INVENTION

The present invention has been achieved to solve the above mentioned problems. It is an object of the present invention to provide a novel lead-free Sn—Bi based alloy having improved wettability and heat resistance as compared to conventional Sn—Bi based alloys, a lower melting point than the eutectic point of 221° C. of the Sn—Ag alloy, and proper solderability.

According to a first aspect of the present invention, the above mentioned object is achieved by providing a solder alloy containing tin, as a major component, and 21 wt.% or less bismuth, 4 wt.% or less silver, 2 wt.% or less (inclusive of zero) copper, and 0.2 wt.% or less nickel.

According to a second aspect of the present invention, the above object is achieved by providing a solder alloy containing tin, as a major component, and 21 wt.% or less bismuth, 4 wt.% or less silver, 2 wt.% or less (inclusive of zero) copper, and 0.1 wt.% or less germanium.

According to a third aspect of the present invention, the above object is achieved by providing a solder alloy containing tin, as a major component, and 21 wt.% or less bismuth, 4 wt.% or less silver, 2 wt.% or less (inclusive of zero) copper, 0.2 wt.% or less nickel, and 0.1 wt.% or less germanium.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
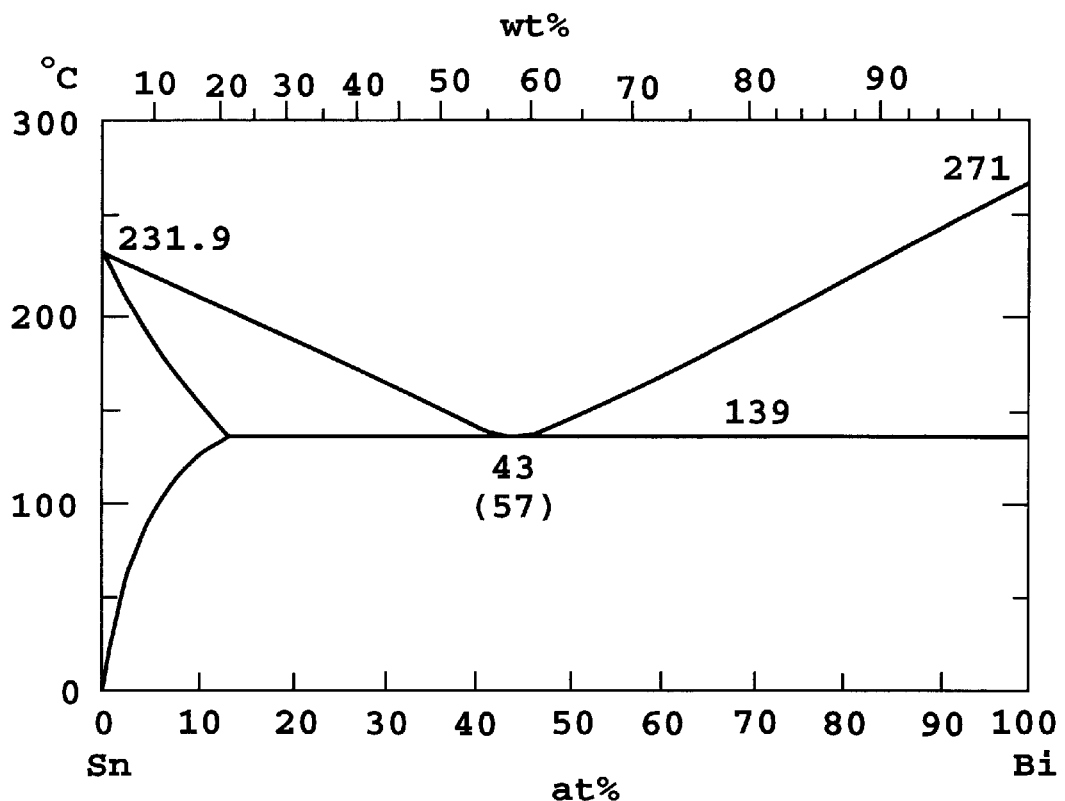
FIG. 1 is a phase diagram of a Sn—Bi binary system.

Adding Ag to Sn improves the heat resistance, fatigue strength, and wettability of an alloy. Highly condensed Ag exists in a crystal grain boundary, and restricts movement of the crystal grain boundary. Thermal fatigue strength is thus improved by the presence of Ag. A Sn—Ag alloy has an eutectic point of 221° C. when 3.5 wt.% Ag is added. Adding more than 3.5 wt.% of Ag increases the liquid phase temperature. Thus, it is required to increase the soldering temperature to ensure wettability. Even if more than 3.5 wt.% of Ag is added, the alloy has a strength which is nearly equal to the strength it had before. Therefore, an adequate amount of Ag addition is 4 wt.% or less.

Adding Cu improves the strength and heat resistance of an alloy without degrading wettability. When a bonding metal is made of Cu, there is provided an effect that elution of Cu from the bonding metal to the solder alloy is restricted. When 3 wt.% or more Cu is added, the liquid phase temperature rapidly rises. In the present invention, 2 wt.% or less Cu is added in order to prevent excessive formation of CuSn intermetallic compound and thus a decrease in fatigue strength.

FIG. 1 is a phase diagram of the Sn—Bi binary system.

Adding Bi lowers the melting point of an Sn-based alloy. As described previously, a Sn—Bi based alloy with an eutectic composition in which 58 wt.% Bi is added has an eutectic point of 139° C. The phase diagram of the Sn—Bi binary system shows that the Sn-Bi alloy with a composition in which 21 wt.% or more Bi is added starts to melt at a temperature of 139° C.

Adding Ni increases the thermal stability of an alloy, since Ni has a high melting temperature. In addition, it was found through the inventor's experiment that when Ni was added to the Sn—Ag alloy, thermal fatigue strength was improved. Therefore, in the case where Ni is added to an Sn—Bi—Ag based alloy, the thermal fatigue strength is expected to be improved.

When Ge is added, a thin Ge oxidized film is formed more preferentially than Sn during solder melting, and oxidization of solder components such as Sn is suppressed. If excess Ge is added, the Ge oxidized film become so thick that the solderability are adversely affected.

A solder alloy was fabricated by fusing raw materials, Sn, Bi, Ag, Cu, Ni, and Ge in an electric furnace. Raw materials having purity of 99.99 % or more were used. A Sn—Bi alloy containing Sn as a major component, and Bi of 21 wt.% or less, Ag of 4 wt.% or less, Cu of 2 wt.% or less, and Ni of 0.2 wt.% or less and an alloy containing Sn as a major component, and 21 wt.% or less Bi, 4 wt.% or less Ag, 2 wt.% or less Cu, 0.2 wt.% or less Ni, and 0.1 wt.% or less Ge are fabricated.

A tensile test of the obtained Sn—Bi based solder alloys was carried out by employing a test piece of 3 mm in diameter. The wettability was measured at 270° C. for the alloys containing 2 wt.% Bi and at 250° C. for the alloys containing 7.5–21 wt.% Bi by the Meniscography.

EXAMPLE

In the examples 0.5 wt.% Cu was added to an alloy with 2–21 wt.% Bi that had been added to a solder composition of Sn-2.0 Ag (the melting point of the 7.5 wt.% added alloy is 212° C.; and the melting point of the 21 wt.% added alloy is 185° C.); and then, 0.1 wt.% Ni and/or 0.05 wt.% Ge were added thereto, respectively, whereby an Sn-2.0 Bi-2.0 Ag-0.5 Cu-0.1 Ni alloy, an Sn-2.0 Bi-2.0 Ag-0.5 Cu-0.1 Ni-0.05 Ge alloy, an Sn-7.5 Bi-2.0 Ag-0.5 Cu-0.1 Ni alloy, an Sn-7.5 Bi-2.0 Ag-0.5 Cu-0.05 Ge alloy, an Sn-7.5 Bi-2.0 Ag-0.5 Cu-0.1 Ni-0.05 Ge alloy, an Sn-21 Bi-2.0 Ag-0.5 Cu-0.1 Ni alloy and an Sn-21 Bi-2.0 Ag-0.5 Cu-0.1 Ni-0.05 Ge alloy were fabricated. The tensile strength, elongation (ductility), and wettability of the obtained Sn—Bi based alloys were measured. For comparison and understanding of the effect of adding Ni further, an Sn-2. 0 Bi-2.0 Ag alloy, an Sn-2.0 Bi-2.0 Ag-0.07 Ni alloy, an Sn-2.0 Bi-2.0 Ag-0.1 Ni alloy, an Sn-7.5 Bi-2.0 Ag alloy, an Sn-7.5 Bi-2.0 Ag-0.5 Cu alloy, an Sn-7.5 Bi-2.0 Ag-0.1 Ni alloy, an Sn-21 Bi-2.0 Ag alloy, and an Sn-21 Bi-2.0 Ag-0.5 Cu alloy were fabricated, and properties were evaluated by the same method.

The evaluation results are shown in Table 1.

TABLE 1

| (wt. %) | | | | | | Tensile strenngth (Kg/mm$^2$) | Elongation (%) | Wettability (mN) |
|---|---|---|---|---|---|---|---|---|
| Bi | Ag | Cu | Ni | Ge | Sn | | | |
| 2 | 2 | — | — | — | Balance | 6.25 | 23.0 | 1.87 |
| 2 | 2 | — | 0.07 | — | Balance | 6.20 | 25.6 | 1.89 |
| 2 | 2 | — | 0.1 | — | Balance | 6.19 | 26.7 | 1.89 |
| 2 | 2 | 0.5 | 0.1 | — | Balance | 7.33 | 26.0 | 1.92 |
| 2 | 2 | 0.5 | 0.1 | 0.05 | Balance | 6.91 | 17.8 | 1.97 |
| 7.5 | 2 | — | — | — | Balance | 9.57 | 14.4 | 1.70 |
| 7.5 | 2 | 0.5 | — | — | Balance | 10.06 | 18.9 | 1.74 |
| 7.5 | 2 | — | 0.1 | — | Balance | 8.61 | 6.3 | 1.74 |
| 7.5 | 2 | 0.5 | 0.1 | — | Balance | 10.12 | 9.4 | 1.78 |
| 7.5 | 2 | 0.5 | — | 0.05 | Balance | 9.73 | 13.7 | 1.80 |
| 7.5 | 2 | 0.5 | 0.1 | 0.05 | Balance | 9.27 | 6.5 | 1.83 |
| 21 | 2 | — | — | — | Balance | 8.6 | 26.9 | 1.54 |
| 21 | 2 | 0.5 | — | — | Balance | 10.51 | 22.4 | 1.57 |
| 21 | 2 | 0.5 | 0.1 | — | Balance | 9.77 | 26.8 | 1.59 |
| 21 | 2 | 0.5 | 0.1 | 0.05 | Balance | 9.65 | 26.8 | 1.62 |

Adding Ni, Cu, and Ge to the Sn-2.0 Bi-2.0 Ag alloy improves a wettability in comparison to the Sn-2.0 Bi-2.0 Ag alloy.

Adding Cu or Ni to the Sn-7.5 Bi-2.0 Ag alloy improves wettability in comparison to the Sn-7.5 Bi-2.0 Ag alloy. Adding Ni or Ge to the Sn-7.5 Bi-2.0 Ag-0 .5 Cu alloy further improves the wettability. Adding both Ni and Ge further improves wettability in comparison to a case in which Ni or Ge is added alone due to the effects of both of these elements.

Further, the Sn-21 Bi-2.0 Ag-0.5 Cu-0.1 Ni alloy and the Sn-21 Bi-2 .0 Ag-0.5 Cu-0.1 Ni-0.05 Ge alloy have better wettability than the Sn-21 Bi-2.0 Ag alloy and Sn-21 Bi-2 .0 Ag-0.5 Cu alloy.

The Sn-7.5 Bi-2.0 Ag based alloys have lower ductility than the Sn-2.0 Bi-2.0 Ag based alloys and Sn-21 Bi-2.0 Ag based alloys.

The Sn-7.5 Bi-2.0 Ag-0.5 Cu alloy obtained by adding 0.5 wt.% Cu to the Sn-7.5 Bi-2.0 Ag alloy has increased tensile strength and ductility. The Sn-7.5 Bi-2.0 Ag-0.1 Ni alloy obtained by adding 0.1 wt.% Ni to the Sn-7.5 Bi-2.0 Ag alloy has lower tensile strength and ductility. However, for the Sn-7.5 Bi-2.0 Ag-0.5 Cu-0.1 Ni alloy obtained by adding both 0.5 wt.% Cu and 0.1 wt.% Ni thereto, ductility is higher than the Sn-7.5 Bi-2.0 Ag-0.1 Ni alloy, and a lowering of ductility decreases. This is assumed to occur because Ni is prone to produce an intermetallic compound with Bi, thus causing the lowering of ductility; and however, when Cu is added together with Ni, Cu and Ni form a solid solution, whereby the intermetallic compound is prevented from being produced, and the lowering of ductility is decreased. Therefore, the Sn-7.5 Bi-2.0 Ag-0.5 Cu-0.1 Ni alloy is an Sn—Bi based alloy having proper tensile strength, ductility, and wettability.

Ge inhibits oxidization of Sn and has the improved stabilizing effect of restricting oxidization of Sn because of less consumption due to oxidization on a surface melted solder as compared to phosphorus that has a similar effect. When solder alloy powder is used for cream soldering, Ge produces a thin oxidized film on its surface, and has an effect on production of spherical grains by surface tension and an effect on the stability of oxidization resistance of grains.

The creep deformation property was tested using a test piece with 3 mm diameter at 125° C., 1 kg/mm$^2$: the first test piece consisted of the Sn-2 Bi-2 Ag; the second was like the first with 0.1 wt.% Ni; the third was like the second with 0.5 wt.% Cu; and the fourth was like the third with 0.05 wt.% Ge. The results organized with a creep rate are shown in Table 2. It is found that as these components were added, the creep rate decreased and the creep deformation resistance increased to provide excellent heat-resistance.

TABLE 2

| | (wt. %) | | | | | Creep rate (%/hr) |
|---|---|---|---|---|---|---|
| | Bi | Ag | Cu | Ni | Ge | Sn | |
| 1st | 2 | 2 | — | — | — | Balance | 1.13 |
| 2nd | 2 | 2 | — | 0.1 | — | Balance | 0.93 |
| 3rd | 2 | 2 | 0.5 | 0.1 | — | Balance | 0.80 |
| 4th | 2 | 2 | 0.5 | 0.1 | 0.05 | Balance | 0.73 |

As eutectic compositions of Sn—Ag—Cu based alloys, Sn-4.7 wt.% Ag-1.7 wt.% Cu and Sn-3.5 wt.% Ag-0.7 wt.% Cu or the like are known. Cu is added at 0.5 wt. % in the above mentioned Sn-7.5 Bi-2.0 Ag-0.5 Cu-0.1 Ni-0.05 Ge alloy. However in consideration of a composition of the aforementioned ternary eutectic alloy, even if Cu is added up to 2.0 wt.%, the effect of the Sn-7.5 Bi-2.0 Ag-0.5 Cu-0.1 Ni-0.05 Ge alloy is maintained. Although the solubility of Ni in Sn is not definite, the eutectic points of Sn—Ni were reported to be 231.2° C. for 0.15 wt.% Ni and 232° C. for 0.18 wt.% Ni (Constitution of Binary Alloys, Second Edition, Max Hansen and Kurt Anderko, McGRAW-HILL Book Company). Further, in consideration of solid solution of Ni in Cu, even if Ni is added up to 0.2 wt.%, the effect of the Sn-7.5 Bi-2.0 Ag-0.5 Cu-0.1 Ni-0.05 Ge alloy is maintained. If 21 wt.% or less Bi is added, Sn is crystallized as a primary crystal from the Sn—Bi based alloy during solidification. Thus, the effect of the Sn-7.5 Bi-2.0 Ag-0.5 Cu-0.1 Ni-0.05 Ge alloy is maintained as it is.

As has been described above, according to a first aspect of the present invention, there is provided a solder alloy containing tin as a major component, and 21 wt.% or less bismuth, 4 wt.% or less silver, 2 wt.% or less copper, and 0.2 wt.% or less nickel. According to a second aspect of the present invention, there is provided a solder alloy containing tin as a major component, and 21 wt.% or less bismuth, 4 wt.% or less silver, 2 wt.% or less copper, and 0.1 wt. % or less germanium. Further, according to a third aspect of the present invention, there is provided a solder alloy containing tin as a major component, and 21 wt.% or less bismuth, 4 wt.% or less silver, 2 wt.% or less copper, 0.2 wt.% or less nickel, and 0.1 wt.% or less germanium. Thus, there is provided a novel lead-free solder alloy having a lower melting point than 221° C (the eutectic point of the Sn—Ag alloy) proper wettability, and superior solderability and heat-resistant properties.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A solder alloy consisting essentially of 21% Bi, 2% Ag, 0.5% Cu, 0.1% Ni and the balance Sn.

2. A solder alloy, consisting essentially of 7.5% Bi, 2% Ag, 0.5% Cu, 0.1 % Ni, 0.05% Ge and the balance Sn.

3. A solder alloy, consisting essentially of 21% Bi, 2% Ag, 0.5% Cu, 0.1 Ni, 0.05% Ge and the balance Sn.

4. A solder alloy consisting of tin, bismuth, silver, copper, nickel and germanium, wherein tin is a major component, bismuth is present in an amount up to about 21 wt. %, silver is present in an amount up to about 4 wt. %, copper is present in an amount up to about 2 wt. %, nickel is present in an amount up to about 0.2 wt. %, and germanium is present in an amount up to about 0.1 wt.%.

5. The solder alloy according to claim 4, consisting of 2% Bi, 2% Ag, 0.5% Cu, 0.1% Ni, 0.05% Ge and the balance Sn.

6. A solder alloy consisting of 21% Bi, 2% Ag, 0.5% Cu, 0.1% Ni and the balance Sn.

7. A solder alloy, consisting of 7.5% Bi, 2% Ag, 0.5% Cu, 0.1% Ni, 0.05% Ge and the balance Sn.

8. A solder alloy, consisting of 21% Bi, 2% Ag, 0.5% Cu, 0.1 Ni, 0.05% Ge and the balance Sn.

* * * * *